No. 711,587.　　　　　　　　　　　　　　　　　Patented Oct. 21, 1902.
F. H. OBER.
ICE VEHICLE.
(Application filed May 16, 1902.)

(No Model.)

WITNESSES:　　　　　　　　　　　　　　　　　INVENTOR
　　　　　　　　　　　　　　　　　　　　　　Franklin H. Ober,
　　　　　　　　　　　　　　　　　　　　　　BY
　　　　　　　　　　　　　　　　　　　　　　　Pierre Barnes
　　　　　　　　　　　　　　　　　　　　　　　　ATTORNEY.

THE NORRIS PETERS CO., PHOTO-LITHO., WASHINGTON, D. C.

UNITED STATES PATENT OFFICE.

FRANKLIN H. OBER, OF SEATTLE, WASHINGTON.

ICE-VEHICLE.

SPECIFICATION forming part of Letters Patent No. 711,587, dated October 21, 1902.

Application filed May 16, 1902. Serial No. 107,588. (No model.)

*To all whom it may concern:*

Be it known that I, FRANKLIN H. OBER, a citizen of the United States, residing at Seattle, in the county of King and State of Washington, have invented certain new and useful Improvements in Ice-Vehicles, of which the following is a specification, reference being had therein to the accompanying drawings.

This invention relates to improvements in vehicles, and particularly to that class adapted to travel over ice or snow.

The object of the invention is to provide a vehicle which is capable of progressing upon a frozen or a soft slushy way with a minimum power and at a maximum of speed. In the design of all vehicles of this class the supporting or traveled surface is treated as a uniformly-hard substance; but it is known that this assumption is fallacious, as in all districts where it is desirable to provide traffic means the bearing-surface passes through various degrees—*i. e.*, from a hard ice or feather snow to a soft slush. It is my plan to produce a vehicle which will as readily travel over a soft surface as a hard one and a rough hummocky one as a smooth one by carrying its own road along with it, so to speak, and consequently most efficiently expend the driving power by propelling the vehicle over or above the supporting-surface rather than through it. I attain these objects by the construction and combination of parts hereinafter described, and illustrated in the accompanying drawings, in which—

Figure 1:
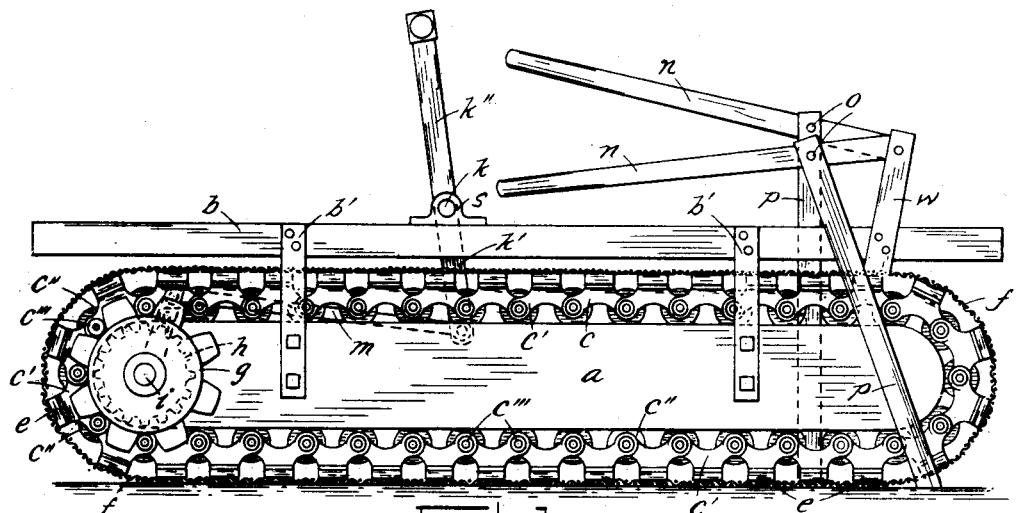
Figure 2:
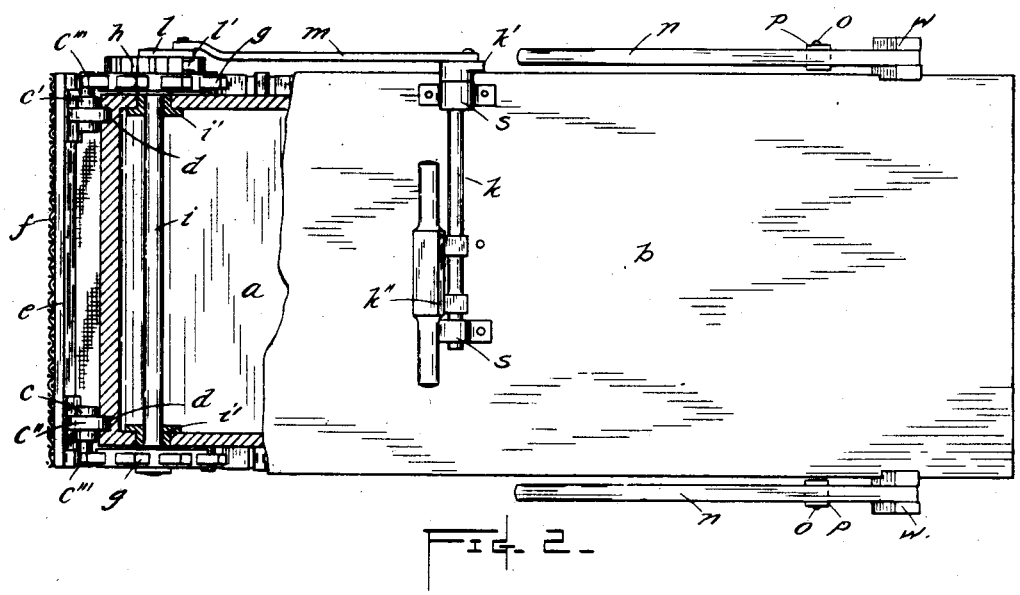

Figure 1 is a longitudinal elevation of a vehicle constructed in accordance with my invention. Fig. 2 is a horizontal view of the same broken away at the forward end.

In the said drawings the letter $a$ designates the body portion, made water-tight in order to buoy up the device in the event of its getting into water. A working and carrying platform $b$ is sustained from the body by supports, such as $b'$.

Passing around the body $a$ in a longitudinal direction is a pair of endless chains $c$, comprised of links $c'$, individually mounted on antifriction-wheels $c''$, which travel in grooves or channel-ways $d$ of the body and positioned adjacent to its sides. Instead of the aforementioned grooves angle-irons or other suitable guiding-strips may be used, if desired. Slats $e$ extend transversely across the said chains to tie the links thereof together in pairs—that is, a slat is fastened to a link on either side. A continuous belt, of canvas or other tough fabric $f$, is attached to the several slats, by which an extended and movable base is provided for propelling the vehicle by a sweeping movement upon the ice or snow. This belt or apron and its carrier-chains are driven by means of sprocket-wheels $g$, which engage with the chain-links $c'$, preferably by providing latterly-projecting studs $c'''$ therefor. The sprocket-wheels $g$ and a ratchet-wheel $h$ are fixedly mounted on a shaft $i$, rotatable in journal-bearings $i'$, secured in the side walls of the body $a$. Though any appropriate means may be utilized to rotate the shaft $i$, I prefer to use manual power by means such as shown on the drawings. Such means comprises a shaft $k$, which is oscillated in bearings $s$ to swing a vibrating arm $k'$ by a hand-actuated lever $k''$, an arm $l$, fulcrumed to shaft $i$, carrying a pawl $l'$, which engages with the said ratchet-wheel, and a rod $m$, connecting the two above-mentioned arms $k$ and $l$.

Positioned upon each side of the vehicle near its rear end is an upright $w$, to which is pivotally connected the end of a brake-lever $n$, from which is suspended intermediate of its length by pivot $o$ a brake-bar $p$. To steer the device, either of the brake-bars may be forced down upon or into the sustaining surface or bed when the lower end is forced rearwardly until the said bar is stopped by the interfering upright, thus permitting great force to swerve the vehicle being exerted with a small exertion by the operator; but if it is desired to stop it or slacken the speed on a downgrade or incline both brake-bars may be simultaneously forced down.

The operation and advantage of the invention are obvious from the foregoing and need no further description here.

Having described my invention, what I claim as new, and desire to secure by Letters Patent, is—

1. In a device of the type set forth, comprising a buoyant body portion, shafts extending through the ends of said body portion and carrying sprocket-wheels on their ends, endless chains engaging over said sprocket-wheels, said chains comprising links each carrying a laterally-projecting stud and an antifriction-wheel located at the point where said links are pivoted to one another, the body adjacent its sides having continuous grooves therein, with the said antifriction-wheels of the chains adapted to travel therein, a series of suitably-spaced slats connecting the links, with a continuous belt attached to the slats, and a platform suspended above the body and chain, and means to operate the sprocket-wheels, substantially as described.

2. A device of the type set forth, comprising a buoyant body portion, with sprocket-wheels mounted on the sides thereof, continuous chains operating over said sprocket-wheels and comprising links each carrying a laterally-projecting stud and an antifriction-wheel, with the wheels extending inwardly and operating on the upper and lower sides of the body in grooves provided therefor, suitably-spaced slats connecting the links with an apron mounted on the slats, a platform supported by the body and extending above the apron, and a means for driving said chains consisting of a ratchet-wheel affixed to one of the sprocket-wheels, an arm mounted on the bearing of said sprocket-wheel and carrying a pawl, with a rod pivoted to the end of the arm, a shaft pivoted transverse of the platform and extending beyond the side of the platform, a vibrating arm on the extending end of the shaft connected to said arm, and a hand-actuated lever connected to the inner end of the shaft, for vibrating the same, the lever being mounted approximately central of the platform, substantially as described.

In testimony whereof I affix my signature in presence of two witnesses.

FRANKLIN H. OBER.

Witnesses:
PIERRE BARNES,
HENRY S. NOON.